US006942556B2

(12) United States Patent
Higuchi

(10) Patent No.: US 6,942,556 B2
(45) Date of Patent: Sep. 13, 2005

(54) POLISHING JIG FOR BEARING FOR USE IN BACK-UP ROLL OF ROLLING MILL

(75) Inventor: Kunio Higuchi, Kashiba (JP)

(73) Assignee: Koyo Seiko Co., Ltd., Osaka (JP)

( * ) Notice: Subject to any disclaimer, the term of this patent is extended or adjusted under 35 U.S.C. 154(b) by 0 days.

(21) Appl. No.: 11/055,050

(22) Filed: Feb. 10, 2005

(65) Prior Publication Data

US 2005/0136815 A1 Jun. 23, 2005

Related U.S. Application Data

(62) Division of application No. 10/487,500, filed as application No. PCT/JP03/07230 on Jun. 6, 2003.

(30) Foreign Application Priority Data

Jun. 7, 2002 (JP) .............................. 2002-167556
Jun. 7, 2002 (JP) .............................. 2002-167557

(51) Int. Cl.[7] .............................................. B24B 5/00
(52) U.S. Cl. ...................... 451/294; 451/342; 451/363; 384/134
(58) Field of Search ............................... 451/177, 178, 451/259, 294, 342, 360, 363; 134/134, 474, 134/475, 477, 607

(56) References Cited

U.S. PATENT DOCUMENTS

| 4,180,946 A | * | 1/1980 | Heijkenskjold et al. ....... 451/24 |
| 5,443,413 A | * | 8/1995 | Pflager et al. ................. 451/11 |
| 5,804,900 A | * | 9/1998 | Taniguchi et al. ......... 310/90.5 |
| 5,833,522 A | * | 11/1998 | Niino et al. ................ 451/294 |

FOREIGN PATENT DOCUMENTS

| JP | 52-126395 | 9/1977 |
| JP | 55-26684 | 2/1980 |
| JP | 57-083351 | 5/1982 |

* cited by examiner

Primary Examiner—Lee D. Wilson
Assistant Examiner—Anthony Ojini
(74) Attorney, Agent, or Firm—Smith, Gambrell & Russell, LLP

(57) ABSTRACT

A polishing jig of a hydraulic integral system is improved to increase efficiency. A polishing jig 1 for bearing for use in back-up roll of rolling mill including a shaft member 2 on which an inner ring 104 of a bearing 100 for use in back-up roll of rolling mill is fitted; and a pressure-oil chamber 12 operative in association with the feeding of a pressure oil into the shaft member 2 to protrude an outer circumferential part of the shaft member 2 radially outwardly, the polishing jig includes an inner-ring fixing portion 16 for axially fixing individual inner rings 104 of a plurality of the bearings 100 fitted on the shaft member 2 as axially arranged, wherein a plurality of the pressure-oil chambers 12 are formed internally of the shaft member 2 in correspondence to the plural bearings 100 fixed on the shaft member 2.

2 Claims, 3 Drawing Sheets

POLISHING JIG FOR BEARING FOR USE IN BACK-UP ROLL OF ROLLING MILL

REFERENCE TO A RELATED APPLICATION

This application is a division of our copending application Ser. No. 10/487,500 filed Feb. 20, 2004, which is a 371 of PCT/03/07230 filed Jun. 6, 2003, which is relied on and incorporated herein by reference.

TECHNICAL FIELD

The present invention relates to a polishing jig for bearing for use in back-up roll of rolling mill.

BACKGROUND ART

A bearing (backing bearing) for use in back-up roll of rolling mill is in contact with a roll at its outer ring as a rotational ring and hence, the outer ring suffers fast deformation of its outside diameter surface or slip scars thereon, thus adversely affecting the thickness of a sheet material being rolled. Accordingly, the bearing requires frequent re-polishing of the outside diameter surface of its outer ring.

As a polishing jig for the outside diameter surface of the outer ring of the bearing for use in back-up roll of rolling mill, there has conventionally been known one disclosed in Japanese Examined Patent Publication No. 63-41704 (hereinafter, referred to as a prior art).

The polishing jig (re-polishing machine) of the prior art performs high accuracy polishing of the outside diameter surface of the outer ring by rotating only the outer ring via an engagement hole formed in the outer ring in a state where fit clearance/internal radial clearance of the bearing is eliminated by hydraulically protruding the polishing jig radially outwardly, the polishing jig on which an inner ring of the bearing is fitted.

However, a single conventional polishing jig can polish only one backing bearing, thus requiring much time to polish a large number of backing bearings. As a consequence, the conventional polishing jig suffers low efficiency.

According to the conventional polishing jig, the engagement hole (carrier hole) is previously formed at an axial end face of the outer ring of the bearing so as to be used to rotate the outer ring. During the polishing process, a carrier tip projected from a work head of a polishing machine is engageably inserted in the engagement hole for rotating the outer ring in unison with the work head. That is, the conventional polishing jig requires the engagement hole to be formed at the end face of the outer ring in order to rotate the outer ring. In a case where a bearing with no engagement hole formed at the end face is to be re-polished, there occurs a need to form the engagement hole, which results in low efficiency.

The present invention is directed to solution to the foregoing problem and has an object to provide a novel technical measure for achieving higher efficiency by improving the conventional polishing jig of a hydraulic integral system as the prior art.

DISCLOSUER OF THE INVENTION

In a first aspect of the present invention, a polishing jig for bearing for use in back-up roll of rolling mill including a shaft member on which an inner ring of a bearing for use in back-up roll of rolling mill is fitted; and a pressure-oil chamber operative in association with the feeding of a pressure oil into the shaft member to protrude an outer circumferential part of the shaft member radially outwardly, the polishing jig comprises an inner-ring fixing portion for axially fixing the individual inner rings of a plurality of the bearings fitted on the shaft member as axially arranged, wherein a plurality of the pressure-oil chambers are formed internally of the shaft member in correspondence to the plural bearings fixed on the shaft member.

According to the first aspect of the present invention, the plural bearings can be fitted on the shaft member as axially arranged thereon so that the individual inner rings can be fixed thereon. Furthermore, since the plural pressure-oil chambers are formed in correspondence to the individual bearings, it is possible to apply a radially-outward expansion force to the corresponding inner rings of the individual bearings. Hence, outside diameter surfaces of the plural bearings can be polished with high accuracy and efficiency.

In a second aspect of the present invention, a polishing jig for bearing for use in back-up roll of rolling mill including a shaft member on which an inner ring of a bearing for use in back-up roll of rolling mill is fitted and axially fixed; and a pressure-oil chamber operative in association with the feeding of a pressure oil into the shaft member to protrude an outer circumferential part of the shaft member radially outwardly, the polishing jig comprises an inner-ring fixing portion for axially fixing the individual inner rings of a plurality of the bearings fitted on the shaft member, wherein a plurality of the individually independent pressure-oil chambers are formed in the shaft member in correspondence to the plural bearings fixed on the shaft member whereas individually independent oil paths communicated with the respective pressure-oil chambers are formed in the shaft member whereby an arrangement for discrete adjustment of oil pressure in the individual pressure-oil chambers is established.

According to the second aspect of the present invention, the plurality of individually independent pressure-oil chambers and oil paths are formed in correspondence to the plural bearings and hence, outside diameter surfaces of the plural bearings can be polished with high accuracy and efficiency. Furthermore, since the individual pressure-oil chambers are adapted for discrete adjustment of oil pressure, the amount of protrusion of the shaft member may be adjusted according to individually varied inside diameters of the inner rings and internal radial clearances of the bearings. Thus, the individual bearings can be polished under optimum conditions.

In a third aspect of the present invention, a polishing jig for bearing for use in back-up roll of rolling mill including a shaft member on which an inner ring of a bearing for use in back-up roll of rolling mill is fitted and axially fixed; and a pressure-oil chamber operative in association with the feeding of a pressure oil into the shaft member to protrude an outer circumferential part of the shaft member radially outwardly, the polishing jig comprises an inner-ring fixing portion for axially fixing the individual inner rings of a plurality of the bearings fitted on the shaft member, and an interconnection portion for interconnecting plural outer rings thereby bringing the individual outer rings into unitary rotation.

According to the third aspect of the present invention, the plural bearings can be fixed so as to be efficiently finished. In addition, the interconnection portion interconnects the individual outer ring, thereby facilitating the synchronous rotation of the outer rings of the plural bearings.

In a fourth aspect of the present invention, the polishing jig of the arrangement of the third aspect hereof further comprises an inner-ring spacer interposed between the inner rings; and an outer-ring spacer interposed between the outer rings as allowed to rotate relative to the inner-ring spacer via a spacer bearing. According to the fourth aspect of the present invention, it is possible to increase the rotational accuracies of the individual bearings, and to ensure a polishing accuracy equal to that of polishing bearings one by one.

In a fifth aspect of the present invention, a polishing jig for an outside diameter surface of a bearing for use in back-up roll of rolling mill including: a shaft member on which an inner ring of a bearing for use in back-up roll of rolling mill is fitted; a pressure-oil chamber formed internally of the shaft member in a manner to be operated by a pressure oil fed thereto to protrude an outer circumferential part of the shaft member radially outwardly; and an inner-ring fixing portion for axially fixing the inner ring, the polishing jig comprises an outer-ring retaining portion for retaining an outer ring of the bearing as allowed to rotate in unison with the outer ring, wherein the outer-ring retaining portion includes a torque transmission portion to which a torque for rotating the outer ring is transmitted from a torque generating machine for generating the torque.

According to the fifth aspect of the present invention, when the outer ring is retained by the outer-ring retaining portion, the torque from the torque generating machine such as a polishing machine can be transmitted to the outer ring via the torque transmission portion provided at the outer-ring retaining portion. This permits even an outer ring free from an engagement hole to be rotated without forming the engagement hole thereat, thus contributing to the increased efficiency. In addition, the versatility of the polishing jig is enhanced because the polishing jig is capable of rotating the outer ring regardless of the presence of the engagement hole.

The above-mentioned outer-ring retaining portion may preferably serve to fix the outer ring axially of the shaft member. In this case, the outer-ring retaining portion is capable of axially fix even the outer ring of a bearing which cannot be axially positioned without the aid of a thrust washer. Thus, the versatility of the polishing jig is even further enhanced.

BEST MODES FOR CARRYING OUT THE INVENTION

Figure 1:
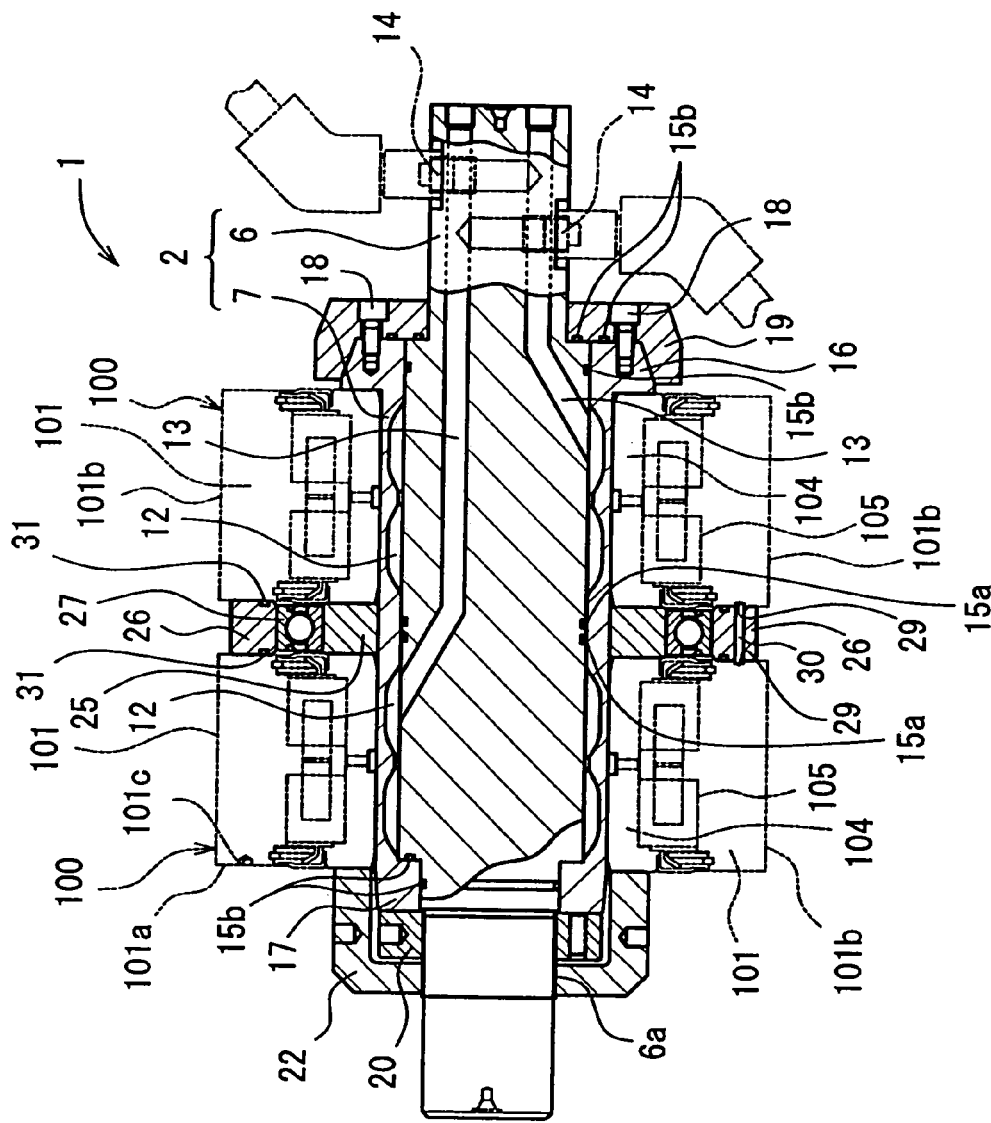
FIG. 1 is a sectional view showing a polishing jig, according to a first embodiment of the present invention.

FIG. 1 shows a polishing jig 1 according to a first embodiment of the present invention. The polishing jig 1 is used for re-polishing outside diameter surfaces of outer rings 101b of a plural number of (specifically, two) bearings (backing bearings) 100 for back-up roll of rolling mill, the bearings 100 staying undisassembled or maintained as bearing assemblies when subjected to the re-polishing process.

It is noted here that the backing bearing 100 as a polishing subject includes an outer ring 101, an inner ring 104 and rollers 105. A side face 101a of the outer ring 101 is formed with an engagement hole 101c to be engaged with a carrier projected from a work head of a polishing machine such as a cylindrical grinder. The outer ring 101 is rotated in unison with the work head by way of engagement between the carrier and the engagement hole 101c.

The polishing jig 1 includes a shaft member 2 on which the inner ring 104 of the bearing assembly 100 is fitted. The shaft member 2 includes a shaft 6, and a sleeve 7 attached to an outer circumference periphery of the shaft 6. The shaft 6 is fixedly supported between opposite centers of the polishing machine such as a cylindrical grinder. The sleeve 7 is fitted on the outer circumference of an axial center of the shaft 6. The sleeve 7 is formed in a greater length than a combined axial length of two (a plural number of) backing bearings 100, such that the sleeve may allow the two backing bearings 100 to be mounted on its outer circumference as axially arranged. An inner circumferential surface of the sleeve 7 is formed with recesses at two (a plural number of) axial places corresponding to the respective backing bearings 100 mounted on the sleeve 7, whereby two (a plural number of) pressure-oil chambers 12, 12 are formed internally of the shaft member 2. The pressure-oil chambers 12, 12 each define a space between the outer circumferential surface of the shaft 6 and the inner circumferential surface of the sleeve 7. The pressure-oil chambers 12, 12 are each continuous along a circumferential direction and have an axial dimension corresponding to that of the inner ring 104 of the bearing 100 such as to be able to fix the inner ring 104 precisely to place when supplied with a pressure oil as will be described hereinlater.

The two pressure-oil chambers 12, 12 are individually independent, whereas two (a plural number of) oil paths 13 communicated with the respective pressure-oil chambers 12, 12 are provided internally of the shaft 6. The oil paths 13 are also individually independent, thus adapted for discrete supply of the pressure oil to the respective pressure-oil chambers 12, 12. Hence, the individual pressure-oil chambers are adapted for discrete adjustment of the hydraulic pressure therein. Open ends of the oil paths 13, 13 are located at respective places on the outer circumferential surface of the shaft 6. These open ends are each provided with a pressure-oil feed port 14 connectable with a pressure-oil feeding machine.

A space between the plural pressure-oil chambers 12, 12 is sealed with an O-ring 15a or the like for prevention of leakage of the pressure oil. Furthermore, an O-ring 15b for prevention of leakage of the pressure oil is disposed at a required place between the shaft 6 and the sleeve 7.

An outer jaw 16 is radially outwardly projected from one axial end of the sleeve 7 (the right-hand side as seen in FIG. 1), whereas an inner jaw 17 is radially inwardly projected from the other axial end of the sleeve (the left-hand side as seen in FIG. 1). A fixing ring 19 is fixed to the outer jaw 16 by means of a bolt 18. On the inner jaw 17 side, a sleeve fixing nut 20 is threadedly engaged with the shaft 6, such that the sleeve 7 is fixed to the shaft 6 as axially positioned with respect to the shaft 6.

An inner-ring fixing nut 22 for fixing the inner ring 104 of the backing bearing 100 is provided at place axially outwardly of the sleeve fixing nut 20 (leftwardly as seen in FIG. 1). The inner-ring fixing nut 22 is mounted to the shaft 6 as threadedly engaged with a thread portion 6a formed on the shaft 6. The nut 22 may be turned thereby to be moved on the shaft 6 in an axial direction thereof, to be removed from the shaft 6 or to fasten and fix the backing bearing 100 at place. The inner-ring fixing nut 22 is in opposing relation with the outer jaw 16 of the sleeve 7. A combination of the nut 22 and the outer jaw 16 constitute an inner-ring fixing portion which collectively clamps the inner rings 104, 104 of two (the plural number of) backing bearings 100, 100

(together with a spacer to be described hereinlater) from the axially opposite sides thereby axially fixing the inner rings.

A spacer is disposed between the backing bearings 100, 100 for providing a space therebetween. The spacer includes an annular inner-ring spacer 25 interposed between the inner rings 104, 104; an annular outer-ring spacer 26 interposed, between the outer rings 101, 101; and a bearing (a single-row deep-groove bearing) 27 interposed between the inner-ring spacer 25 and the outer-ring spacer 26.

The outer-ring spacer 26 is allowed to rotate relative to the inner-ring spacer 25 by means of the bearing 27. The outer-ring spacer 26 includes a connector pin (interconnection portion) 30 engaged with connector-pin engagement holes 29, 29 formed in opposite side faces of the backing bearings 100, 100, the connector pin 30 interconnecting the outer rings 101, 101 of the bearings such that the outer rings 101, 101 of the bearings may be rotated in unison. The interconnection of the plural outer rings 101, 101 via the connector pin 30 is advantageous in that all the outer rings 101 can be brought into unitary rotation simply by rotating any one of the outer rings 101. The connector-pin engagement hole 29 is located on the opposite side face from that formed with the engagement hole 101c and circumferentially shifted 180° relative to the engagement hole 101c, such that the outer ring 101 may not be decreased in strength due to the formation of the engagement holes 29, 101c. Although the description differentiates the connector-pin engagement hole 29 from the engagement hole 101c for clarity, these engagement holes may be formed the same way. In the bearing 100, what is needed is to form the engagement holes at two places but these holes need not be differentiated from each other.

By virtue of the spacers 25, 26 provided between the backing bearings 100, 100, the bearings 100, 100 can attain an excellent rotation accuracy of their outer rings 101, and thereby to ensure a polishing accuracy of a level equal to that of polishing the backing bearings 100, 100 one by one.

The outer-ring spacer 26 has a smaller outside diameter than that of the backing bearing 100 such as to obviate interference with the polishing of the outside diameter surface of the outer ring 101. The outer-ring spacer 26 is provided with a sealing member such as an O-ring 31 at its side faces contacting the outer rings 101, 101, thereby preventing the invasion of a polishing fluid and foreign substances.

The two backing bearings 100, 100 may be mounted to the polishing jig 1 in the following manner. First, in a state where the inner-ring fixing nut 22 is removed from the shaft member 2, both the bearings 100, 100 interconnected with each other as clamping the spacers 25, 26 therebetween are fitted on the shaft member 2 from the left side thereof as seen in FIG. 1. Thus, one of the bearings 100, 100 is pressed against the outer jaw 16 at one side face of its inner ring 104. Subsequently, the inner-ring fixing nut 22 is mounted so as to clamp these bearings 100, 100 whereby the bearings 100, 100 are axially fixed to place.

The polishing jig 1 with the backing bearings 100, 100 mounted thereon is mounted to the polishing machine. The pressure-oil feed ports 14, 14 at the shaft 6 are each connected with respective pressure-oil feed pipes of a manually operated or automated pressure-oil feeding machine (not shown) for feeding the pressure oil to the respective pressure-oil chambers 12, 12. The pressure oil supplied to the respective pressure-oil chambers 12, 12 causes the outer circumferential part (sleeve 7) of the shaft member 2 to protrude radially outwardly and then the inner rings 104 to protrude radially outwardly. The individual pressure-oil chambers 12, 12 are adjusted for elimination of radial clearance so as to ensure the high-accuracys polishing. Since the pressure-oil chambers 12, 12 can be discretely controlled in the oil pressure, it is easy to cope with the variations of the inner-ring inside diameter or of the internal radial clearance of the individual backing bearings 100, 100.

When the polishing machine is actuated to rotate one of the outer rings 101, 101 via the engagement hole 101c while the shaft member 2 is fixed to inhibit the rotation thereof, the other outer ring 101 connected with the former outer ring 101 via the connector pin 30 is also rotated in unison, so that the outside diameter surfaces 101a, 101a of the two (plural) outer rings 101, 101 can be simultaneously re-polished with an unillustrated grinding stone.

Figure 2:
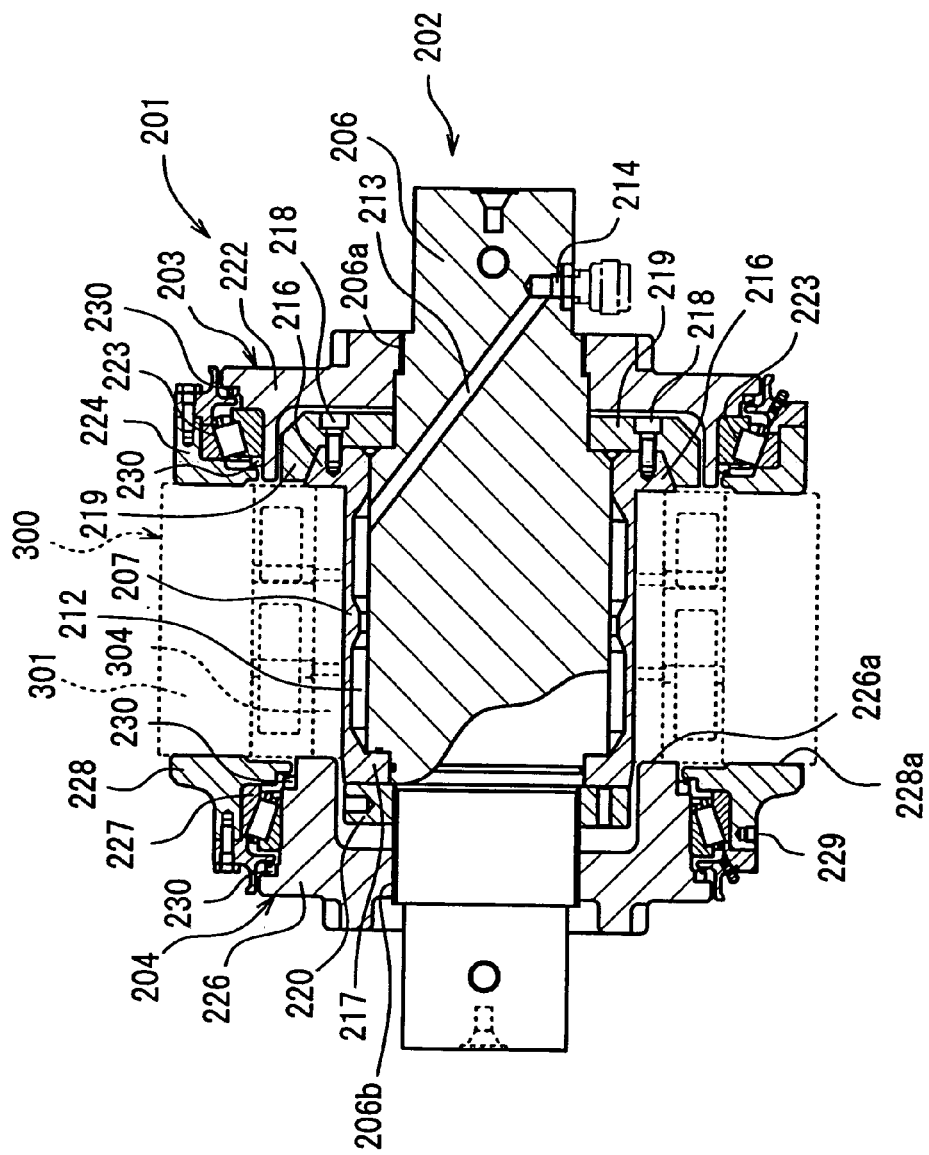
FIG. 2 is a sectional view showing a polishing jig according to a second embodiment hereof.
Figure 3:
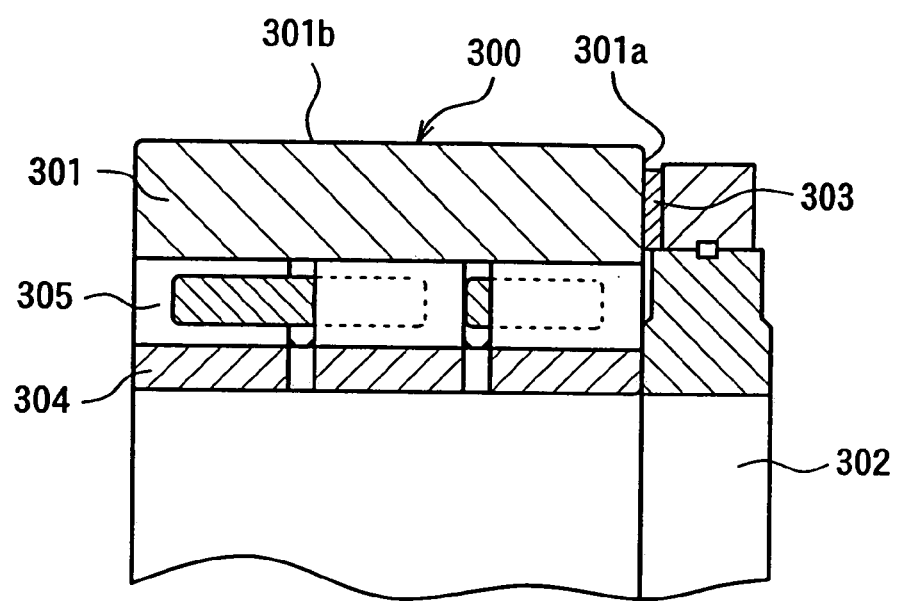
FIG. 3 is a sectional view showing a backing bearing free from a jaw.

FIG. 2 illustrates a polishing jig 201 according to a second embodiment of the present invention. The polishing jig 201 is favorably used for re-polishing an outside diameter surface 301b of an outer ring of a bearing 300 for use in back-up roll of rolling mill (backing bearing) as shown in FIG. 3 without disassembling the bearing or maintaining the bearing assembly as it is. The polishing jig 201 is particularly suited for a bearing free from an engagement hole to engageably receive a carrier of a work head.

This bearing 300 differs from the bearing finished by the prior art disclosed in Japanese Examined Patent Publication No. 63-41704. That is, this bearing 300 is not formed with a jaw at an inside diameter portion of its outer ring. In the case of the bearing 300 wherein an outer ring 301 is free from the jaw as shown in FIG. 3, a thrust washer 303 formed from a resin material is interposed between a back-up saddle 302 and an end face 301a of the outer ring 301 for the purpose of axially fixing the outer ring 301 to place. In the case of the bearing 300 requiring the thrust washer 303, the end face 301a of the outer ring 301 will sustain heat cracks caused by friction with the thrust washer 303. Therefore, if the engagement hole to engageably receive the carrier of the work head is formed in the end face 301a of the outer ring 301, the outer ring 301 is decreased in strength so as to be prone to failure. For this reason, the bearing 300 requiring the thrust washer 303 cannot be formed with the engagement hole.

In a case where the bearing 300 requiring the thrust washer 303, as shown in FIG. 3, is mounted to the prior art polishing jig, it is impossible to axially fix the outer ring 301 to place by means of the thrust washer 303. In this respect, as well, the bearing 300 is inapplicable to the prior-art polishing jig.

The polishing jig 201 according to the second embodiment is arranged as follows in order to polish even the bearing 300 shown in FIG. 3.

Specifically, the polishing jig 201 includes a shaft member 202 on which an inner ring 304 of the bearing assembly 300 is fitted; and a first bearing fixing portion 203 and a second bearing fixing portion 204 provided on the shaft member 202 and axially opposing each other.

The shaft member 202 includes a shaft 206, and a sleeve 207 mounted on an outer circumference of the shaft 206. The shaft 206 is fixedly supported between opposite centers of the polishing machine such as a cylindrical grinder. The sleeve 207 is fitted on the outer circumference of an axial center of the shaft 206. The sleeve 207 is formed with a recess at an inner circumferential surface thereof, so that a pressure-oil chamber 212 is formed internally of the shaft member 202. The pressure-oil chamber 212 defines a space between the outer circumferential surface of the shaft 206 and the inner circumferential surface of the sleeve 207. The pressure-oil chamber 212 is continuous along a circumferential direction and has an axial dimension corresponding to that of the inner ring 304 such as to be able to fix the inner ring 304 precisely to place as supplied with the pressure oil as will be described hereinlater.

An oil path 213 for supplying the pressure oil to the pressure-oil chamber 212 is provided internally of the shaft 206. An open end of the oil path 213 is located on the outer circumferential surface of the shaft 206, and is provided with a pressure-oil feed port 214 connectable to the pressure-oil feeding machine.

An outer jaw 216 is radially outwardly projected from one axial end of the sleeve 207 (the right-hand side as seen in FIG. 2), whereas an inner jaw 217 is radially inwardly projected from the other axial end thereof (the left-hand side as seen in FIG. 2). A fixing ring 219 is fixed to the outer jaw 216 by means of a bolt 218. On the inner jaw 217 side, a sleeve fixing nut 220 is threadedly engaged with the shaft 206, such that the sleeve 207 is fixed to the shaft 206 as axially positioned with respect to the shaft 206.

The first bearing fixing portion 203 is mounted to the shaft 206 at place axially shifted from the sleeve 207 in one direction (the right-hand side as seen in FIG. 2). The second bearing fixing portion 204 is mounted to the shaft 206 at place axially shifted from the sleeve in the other direction (the left-hand side as seen in FIG. 2).

The first bearing fixing portion 203 includes a body 222 mounted to the shaft 206 via threaded engagement with a thread portion 206a formed on the shaft 206; and a first outer-ring fixing portion 224 carried on the body 222 as allowed to rotate relative thereto via a bearing (conical roller bearing) 223.

The second bearing fixing portion 204 includes a body 226 mounted to the shaft 206 via threaded engagement with a thread portion 206b formed on the shaft 206; and a second outer-ring fixing portion 228 carried on the body 226 as allowed to rotate relative thereto via a bearing (conical roller bearing) 227.

The body 226 of the second bearing fixing portion 204 axially opposes the outer jaw 216 of the sleeve 207. A combination of the body 226 of the second bearing fixing portion 204 and the outer jaw 216 constitute the inner-ring fixing portion which clamps the inner ring 304 of the backing bearing 300 to be polished (a polishing subject) on the laterally opposite sides thereof thereby axially fixing the inner ring 304. Further, the combination of the body 226 and the outer jaw 216 also constitute a roller fixing portion for axially positioning rollers 305 of the backing bearing 300.

The first outer-ring fixing portion 224 and the second outer-ring fixing portion 228 axially oppose each other. A combination of these outer-ring fixing portions 224, 228 constitute an outer-ring 301 retaining portion which retains the outer ring 301 of the backing bearing 300 to be polished (the polishing subject) as clamping the outer ring 301 on the laterally opposite sides thereof and also axially fixes the outer ring 301.

These outer-ring fixing portions 224, 228 constituting the outer-ring retaining portion are rotatable relative to the respective bodies 222, 226 fixed to the shaft 206 and hence, the outer-ring fixing portions 224, 228 are rotatable relative to the shaft 206 (the shaft member 202) as well as to the inner ring 304 fixed on the shaft member 202. Thus, the outer ring 301 and the outer-ring fixing portions 224, 228 can be rotated in unison while the polishing jig 201 and the inner ring 304 are held stationary.

The second outer-ring fixing portion 228 is formed with an engagement hole 229 to engage with a carrier projected from a work head of a polishing machine (a torque generating machine) such as a cylindrical grinder. The engagement hole 229 serves as a torque transmission portion for receiving a torque transmitted from the work head, so that the outer ring 301 is rotated in unison with the work head. It is noted here that the engagement hole 229 as the torque transmission portion may be replaced by a pin or the like.

The outer-ring fixing portions 224, 228 clamp the outer ring 301 therebetween as pressed against the laterally opposite sides thereof for the overall circumferential length thereof. Therefore, the polishing fluid and foreign substance are prevented from invading into the backing bearing 300 during the polishing process.

An oil seal 230 is provided at respective places between the body 222 and the first outer-ring fixing portion 224 and between the body 226 and the second outer-ring fixing portion 228. The first bearing fixing portion 203 and the second bearing fixing portion 204 are constructed as a grease sealed type with oil seal. Thus, the polishing jig has excellent internal lubricability and serviceability.

The backing bearing 300 may be mounted to the polishing jig 201 as follows. First, in a state where the first bearing fixing portion 203 and the second bearing fixing portion 204 are removed from the shaft member 202, the backing bearing 300 is fitted on the shaft member 202 from the left-hand side as seen in FIG. 2, so as to press one end face of the inner ring 304 of the bearing against the outer jaw 216. Subsequently, the second bearing fixing portion 204 is mounted on the shaft member 202, so that the inner ring 304 is fixed as clamped between the outer jaw 216 and the body 226. It is noted here that the body 226 of the second bearing fixing portion 204 has its inner-ring abutment face 226a formed flush with an outer-ring abutment face 228a of the second outer-ring fixing portion 228 and hence, the outer-ring abutment face 228a is also pressed against the outer ring 301. When the first bearing fixing portion 203 is mounted to the shaft member 202 in the final step, the outer ring 301 is securely held by the first outer-ring fixing portion 224 and the second outer-ring fixing portion 228 therebetween. The first outer-ring fixing portion 224 and the second outer-ring fixing portion 228 have a smaller outside diameter than that of the bearing 300 so as to obviate interference with the polishing of the outside diameter surface of the outer ring 301. According to the embodiment, the second bearing fixing portion 204 is a common component having dual functions of fixing the inner ring and fixing the outer ring, thus contributing to the reduction of the number of components and facilitating the assembly/disassembly of the jig.

The polishing jig 201 with the backing bearing 300 mounted thereto is mounted to the polishing machine. A pressure oil pipe from the manually operated or automated pressure-oil feeding machine (not shown) is connected to the pressure-oil feed port 214 of the oil path 213 in the shaft 206 and the pressure oil is supplied to the pressure-oil chamber 212. The pressure oil supplied to the pressure-oil chamber 212 causes the outer circumferential part (sleeve 207) of the shaft member 202 to protrude radially outwardly and then the inner ring 304 to protrude radially outwardly. The oil pressure may be properly adjusted such as to eliminate the radial clearance in the bearing 300. The high-accuracy polishing may be ensured by eliminating the radial clearance.

In addition, the polishing machine may be actuated to rotate the outer ring 301 via the engagement hole 229 as the torque transmission portion while the shaft member 202 is securely held to prevent the rotation thereof, whereby the outside diameter surface of the outer ring 301 can be re-polished with an unillustrated grinding stone.

According to the second embodiment, the polishing jig 201 of a hydraulic integral system is adapted for high-accuracy re-polishing of even the backing bearing 300 formed with no engagement hole (carrier hole) at the outer ring 301. The polishing jig 201 of the second embodiment negates the need for working the engagement hole and also prevents the outer ring from suffering the decreased strength associated with the provision of the engagement hole. Furthermore, the polishing jig 201 of the hydraulic integral system is also capable of highly precisely re-polishing even the backing bearing 300 of the structure as shown in FIGS. 2 and 3 wherein the outer ring 301 cannot be axially fixed because of the absence of the jaw.

INDUSTRIAL APPLICABILITY

The polishing jig of the present invention may be used for efficiently polishing the bearing for use in back-up roll of rolling mill.

What is claimed is:

1. A polishing jig for an outside diameter surface of a bearing for use in back-up roll of rolling mill including:

a shaft member on which an inner ring of a bearing for use in back-up roll of rolling mill is fitted;

a pressure-oil chamber formed internally of said shaft member in a manner to be operated by a pressure oil fed thereto to protrude an outer circumferential part of said shaft member radially outwardly; and an inner-ring fixing portion for axially fixing said inner ring;

the polishing jig comprising an outer-ring retaining portion for retaining an outer ring of said bearing as allowed to rotate in unison with the outer ring, wherein the outer-ring retaining portion includes a torque transmission portion to which a torque for rotating said outer ring is transmitted from a torque generating machine for generating said torque.

2. A polishing jig for the outside diameter surface of bearing for use in back-up roll of rolling mill as claimed in claim 1, wherein said outer-ring retaining portion serves to fix said outer ring axially of said shaft member.

* * * * *